US012254691B2

(12) United States Patent
Rai et al.

(10) Patent No.: US 12,254,691 B2
(45) Date of Patent: Mar. 18, 2025

(54) COOPERATIVE-CONTRASTIVE LEARNING SYSTEMS AND METHODS

(71) Applicants: TOYOTA RESEARCH INSTITUTE, INC., Los Altos, CA (US); The Board of Trustees of the Leland Stanford Junior University, Stanford, CA (US)

(72) Inventors: Nishant Rai, Stanford, CA (US); Ehsan Adeli Mosabbeb, Menlo Park, CA (US); Kuan-Hui Lee, Los Altos, CA (US); Adrien Gaidon, Los Altos, CA (US); Juan Carlos Niebles, Mountain View, CA (US)

(73) Assignees: TOYOTA RESEARCH INSTITUTE, INC., Los Altos, CA (US); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 738 days.

(21) Appl. No.: 17/111,352

(22) Filed: Dec. 3, 2020

(65) Prior Publication Data

US 2022/0180101 A1    Jun. 9, 2022

(51) Int. Cl.
  *G06V 20/40*    (2022.01)
  *G06N 20/00*    (2019.01)
  *G06V 30/194*    (2022.01)

(52) U.S. Cl.
  CPC ............. *G06V 20/41* (2022.01); *G06N 20/00* (2019.01); *G06V 30/194* (2022.01)

(58) Field of Classification Search
  CPC ....... G06V 20/41; G06V 30/194; G06N 20/00
  See application file for complete search history.

(56) References Cited

U.S. PATENT DOCUMENTS

| 2018/0124425 | A1 | 5/2018 | Van Leuven |
| 2020/0202074 | A1 | 6/2020 | Ghulati |
| 2020/0211206 | A1* | 7/2020 | Wang ........................ G06N 3/08 |
| 2022/0044056 | A1* | 2/2022 | Liu ........................ G06N 3/045 |
| 2022/0114365 | A1* | 4/2022 | Lukác ........................ G06T 7/75 |

OTHER PUBLICATIONS

Tschannen et al., "Self-Supervised Learning of Video-Induced Visual Invariances," Google Research, Brain Team, arXiv:1912.02783v2 [cs.CV]; Apr. 1, 2020, 18 pages.

(Continued)

*Primary Examiner* — Daniel T Tekle
(74) *Attorney, Agent, or Firm* — SHEPPARD, MULLIN, RICHTER & HAMPTON LLP; Daniel N. Yannuzzi

(57) ABSTRACT

Systems and methods for multi-view cooperative contrastive self-supervised learning, may include receiving a plurality of video sequences, the video sequences comprising a plurality of image frames; applying selected images of a first and second video sequence of the plurality of video sequences to a plurality of different encoders to derive a plurality of embeddings for different views of the selected images of the first and second video sequences; determining distances of the derived plurality of embeddings for the selected images of the first and second video sequences; detecting inconsistencies in the determined distances; and predicting semantics of a future image based on the determined distances.

20 Claims, 9 Drawing Sheets

(56) References Cited

OTHER PUBLICATIONS

Tian et al., "Contrastive Multiview Coding," arXiv:1906.05849v4 [cs.CV]; Mar. 11, 2020, pp. 1-16.
Luo et al., "Unsupervised Learning of Long-Term Motion Dynamics for Videos," Stanford University, arXiv:1701.01821v3 [cs.CV] Apr. 11, 2017, pp. 1-10.
Mathieu et al., "Deep multi-scale video prediction beyond mean square error," https://arxiv.org/pdf/1511.05440.pdf%5D; Feb. 26, 2016, pp. 1-14.
Han et al., "Video Representation Learning by Dense Predictive Coding," https://arxiv.org/pdf/1909.04656.pdf, Sep. 27, 2019, pp. 1-13.
Vondrick et al., "Generating Videos with Scene Dynamics," https://arxiv.org/pdf/1609.02612.pdf; Oct. 26, 2016, pp. 1-10.
Bojar, Daniel, "Using Deep Learning to Classify Relationship State with DeepConnection," https://towardsdatascience.com/using-deep-learning-to-classifyrelationship-state-with-deepconnection-227e9124c72?gi=50c3b167e4d3; Aug. 16, 2019, pp. 1-7.
Sayed et al., "Cross and Learn: Cross-Modal Self-Supervision," https://arxiv.org/pdf/1811.03879.pdf; Apr. 29, 2019, pp. 1-15.

\* cited by examiner

COOPERATIVE-CONTRASTIVE LEARNING SYSTEMS AND METHODS

TECHNICAL FIELD

The present disclosure relates generally to self-supervised semantic learning, and in particular, some implementations may relate to self-supervised semantic learning using multiple embeddings from a plurality of images.

DESCRIPTION OF RELATED ART

There has been a recent surge in interest for approaches to video labeling that utilize self-supervised methods for visual representation learning. Recent advances in visual representation learning have demonstrated impressive performance compared to their supervised counterparts. Developments in the video domain have attempted to make similar improvements.

Videos are a rich source for self-supervision, due to the inherent temporal consistency in neighboring frames. One approach to exploiting this temporal structure is predicting future context based on the present. Such approaches perform future prediction in mainly two ways: (1) predicting a reconstruction of future frames; and (2) predicting features representing the future frames. If the goal is learning high-level semantic features for other downstream tasks, then complete reconstruction of frames is unnecessary. Inspired by developments in language modelling, some solutions propose losses that focus only on the latent embedding using frame-level context. Another approach proposes utilizing spatio-temporal context to learn meaningful representations. Even though such developments have led to improved performance, the quality of the learned features is still lagging behind that of their supervised counterparts.

Due to the lack of labels in self-supervised settings, it is impossible to make direct associations between different training instances. Instead, prior work has learned associations based on structure, either in the form of temporal or spatial proximity of patches extracted from training images or videos. However, the contrastive losses utilized enforce similarity constraints between instances from the same videos while pushing instances from other videos far away even if they represent the same semantic content. This inherent drawback forces learning of features with limited semantic knowledge and encourages performing low-level discrimination between different videos. Conventional approaches suffer from this restriction leading to poor representations.

Multi-view learning has been used to improve representation quality. Conventional solutions learn features utilizing multiple views with the motivation that information shared across views has valuable semantic meaning. A majority of these approaches directly utilize core ideas such as contrastive learning and mutual information maximization. Although the fusion of views leads to improved representations, such approaches also utilize contrastive losses, consequently suffering from the same drawback of low-level discrimination between similar instances.

BRIEF SUMMARY OF THE DISCLOSURE

According to various embodiments of the disclosed technology A method for multi-view cooperative contrastive self-supervised learning may include: receiving a plurality of video sequences, the video sequences comprising a plurality of image frames; applying selected images of a first and second video sequence of the plurality of video sequences to a plurality of different encoders to derive a plurality of embeddings for different views of the selected images of the first and second video sequences; determining distances of the derived plurality of embeddings for the selected images of the first and second video sequences; detecting inconsistencies in the determined distances; and predicting semantics of a future image based on the determined distances.

According to other embodiments system for multi-view cooperative contrastive self-supervised learning may include: a processor; and memory coupled to the processor to store instructions, which when executed by the processor, cause the processor to perform operations, the operations comprising: receiving a plurality of video sequences, the video sequences comprising a plurality of image frames; applying selected images of a first and second video sequence of the plurality of video sequences to a plurality of different encoders to derive a plurality of embeddings for different views of the selected images of the first and second video sequences; determining distances of the derived plurality of embeddings for the selected images of the first and second video sequences; detecting inconsistencies in the determined distances; and predicting semantics of a future image based on the determined distances.

Embodiments may further include the operation of partitioning the received plurality of video sequences into disjoint blocks; and wherein applying selected images of a first and second video sequence of the plurality of video sequences to a plurality of respective encoders to derive a plurality of embeddings may include: transforming the partitioned disjoint blocks into a corresponding latent representations for the blocks; and generating context representations from the latent representations.

In various embodiments predicting future semantics based on the determined distances may include capturing contextual semantics and frame level semantics to predict a latent state of future images.

Embodiments may further include using predicted semantics of a future image to predict semantics of an image that is farther into the future than the future image.

Embodiments may further include computing a noise contrastive estimation loss over at least some of the plurality of embeddings. The the noise contrastive estimation loss may include an entropy loss distinguishing a positive pair of embeddings from negative pairs of embeddings in a video sequence.

The plurality of different encoders for the selected images of the first and second video sequences may include at least two of a flow encoder, an RGB encoder and a keypoint encoder.

Determining distances may include determining view-specific distances for the multiple views, and wherein the operations further comprise synchronizing the distances across all views. Embodiments may further include enforcing a consistency loss between distances from each of the multiple views. Embodiments may further include deriving discriminative scores based on pairs of embeddings that comprise positive and negative distances.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein provide self-supervised visual representation learning for efficient video analysis. Embodiments may be implemented to use data-driven sampling to leverage implicit relationships between multiple input video views, whether observed (e.g. RGB) or inferred (e.g. flows, segmentation masks, poses). The system may be configured to experimentally evaluate representations on the downstream task of action recognition.

Embodiments may include a technique referred to herein as Cooperative Contrastive Learning (CoCon), to achieve improved visual representations. CoCon may also be implemented to overcome shortcomings associated with multi-view learning. In various implementations, each view sees a specific pattern, which can be useful to guide other views and improve representations. Systems and methods may be configured to utilize inter-view information, and this can help to avoid the drawback of discriminating similar instances. Because each view may provide information regarding a different aspect of the videos, this allows the system to suggest or infer potentially similar instances to other views. This information may be used in a self-supervised multi-view setting to infer implicit relationships between instances. These associations may then be used in training to learn better representations for downstream applications such as video classification and action recognition.

Figure 1:
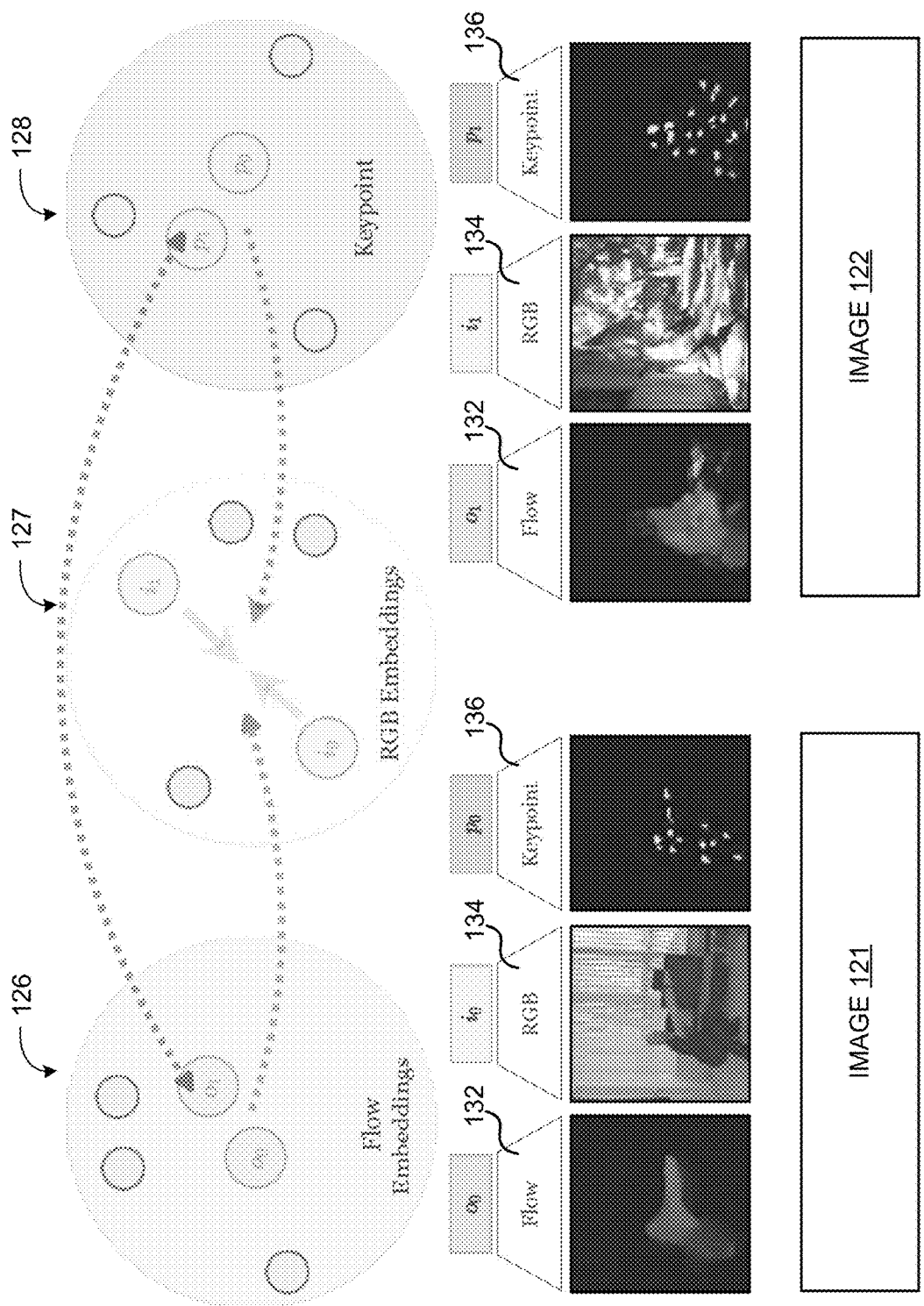
FIG. 1 illustrates an example overview of Cooperative Contrastive Learning (CoCon) in accordance with various embodiments.

FIG. 1 illustrates an example overview of Cooperative Contrastive Learning (CoCon) in accordance with various embodiments. This example illustrates a comparison of two different images 121, 122, representing a pair of instances. In this example, the instances are people doing squats. In other applications, a different quantity of images and instances can be compared. Multiple views may be created corresponding to the instances. In this example, three different views are provided corresponding to each image. These views include flow embeddings 126, RGB embeddings 127 and keypoint embeddings 128. In other example embodiments, other or additional embeddings may be utilized. The multiple views may be computed using view-specific deep encoders f's. In this example, a flow encoder 132 is used to provide flow embeddings 126, and RGB encoder 134 is used to provide RGB embeddings 127 and a keypoint encoder 136 is used to provide keypoint embeddings 128. Flow embeddings $o_0$, RGB embeddings $i_0$ and KeyPoint embeddings $p_0$ each correspond to image 121, while flow embeddings $o_1$, RGB embeddings $i_1$ and KeyPoint embeddings $p_1$ each correspond to image 122.

In the illustrated example, images 121 and 122 have a similar optical-flow $o=f_{flow}$ and pose keypoints (keypoint) $p=f_{keypoint}$ features but their image $i=f_{rgb}$ features are far apart. This is illustrated by the physical separation between the respective embeddings in the diagram. Because the flow embeddings 126 and KeyPoint embeddings 128 for these two instances are close together (i.e., similar), these features can be used for training in a self-supervised manner. In this example, while the images 121, 122 are similar, the RGB embeddings 127 are far apart, which is more than likely primarily a result of the lighting and background in the images being different. Embodiments may leverage these inconsistencies by encouraging the distances in all views to become similar. For example, a high similarity of $o_0$, $o_1$ and $p_0$, $p_1$ nudges $i_0$, $i_1$ towards each other in the RGB space.

As this example illustrates, embodiments may leverage different views/inputs that all include information on the action, and determine which features are better candidates to use for training. Embodiments may use embeddings that are sufficiently close as a positive example as well as distant embeddings as a negative example for the training. Embodiments may use a cosine distance to determine the distance between embeddings. The systems and methods may use contrast of loss learning instead of labels to provide self-supervised learning to train a backbone, which can be used for recognition. Combining multiple views can allow a better representation for downstream applications.

As this example illustrates, each view may be analyzed to provide a specific pattern, which can then be useful to guide other views and improve representations. Inter-view information can be leveraged and each view can provide a different aspect of the images (which may include video images) to suggest potentially similar instances to other views. Embodiments can examine multiple embeddings from multiple instances to infer relationships between instances in a self-supervised, multi-views setting. These relationships may be used to train representations for downstream applications such as video classification and action recognition.

Embodiments may be implemented to capitalize on available views of the input such as RGB frames and optical flow. Embodiments may further leverage high-level inferred semantics as additional noisy views, such as human pose keypoints and segmentation masks generated, for example, using off-the-shelf models. Examples of off-the-shelf models may include TVL1 for optical flow, Detectron2 for keypoint detection, and human segmentation. These views are not independent, as they can be derived from the original input images. However, they are complementary and may lead to significant gains, allowing effective training even with noisy related views. The extensible nature of this framework and the utilization of available views used make it possible to use embodiments described herein with any publicly available video dataset and other contrastive learning approaches.

Figure 2:
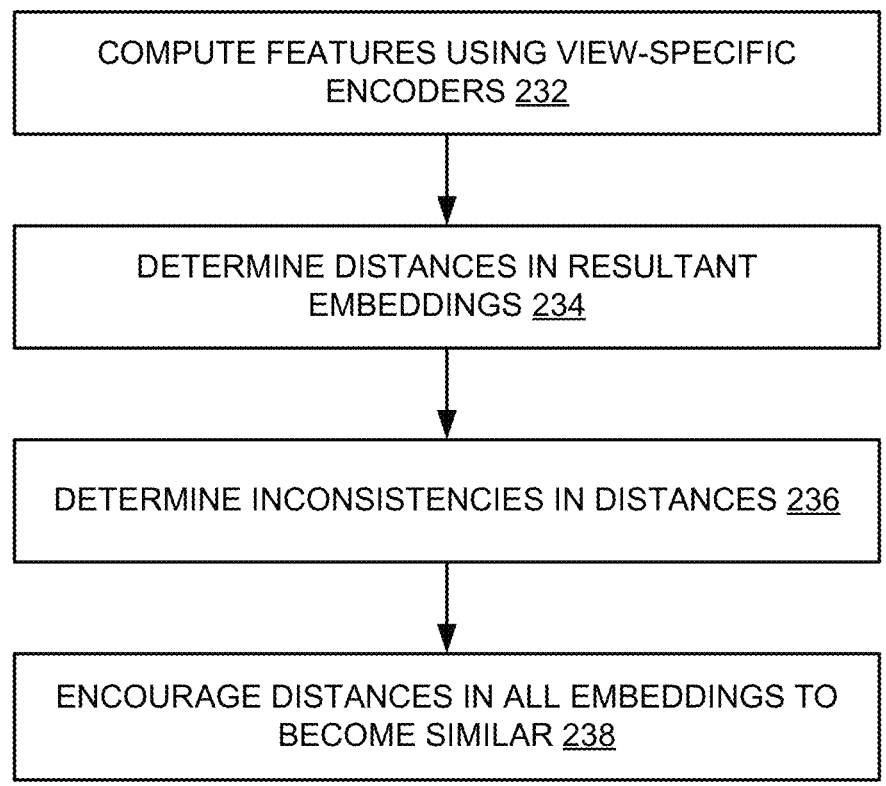
FIG. 2 is a flow diagram illustrating an example process for cooperative contrastive learning in accordance with various embodiments.

FIG. 2 is a flow diagram illustrating an example process for cooperative contrastive learning in accordance with various embodiments. Referring now to FIG. 2, at operation 232 the system computes features using view-specific encoders. For example, in the embodiment illustrated in FIG. 1, the system utilized 3 view-specific encoders, flow encoders 132, RGB encoders 134, and KeyPoint encoders 136. These result in corresponding embeddings $o_0$, $o_1$, $i_0$, $i_1$ and $p_0$, $p_1$ in their respective flow embeddings 126, RGB embeddings 127 and KeyPoint embeddings 128.

At operation 234, the system determines distances in the resultant embeddings $o_0$, $o_1$, $i_0$, $i_1$ and $p_0$, $p_1$. These distances may reflect, for example, a loss in each embedding from one image to the next. In the example of FIG. 1, flow embeddings 126 and KeyPoint embeddings 128 or relatively close while RGB embeddings 127 are at a greater distance. At operation 236, the system determines the inconsistencies in the distances. Again, as seen in the example of FIG. 1, the distances of RGB embeddings 127 is inconsistent with the distances of flow embeddings 126 and KeyPoint embeddings 128.

At operation 238, the system encourages distances in all embeddings to become similar. Because embodiments may use contrast in learning, the network tends to learn a high level representation to represent all the tasks with similar semantics (e.g., similar actions). Embodiments may treat the similarities as having a close distance between the embeddings.

Figure 3:
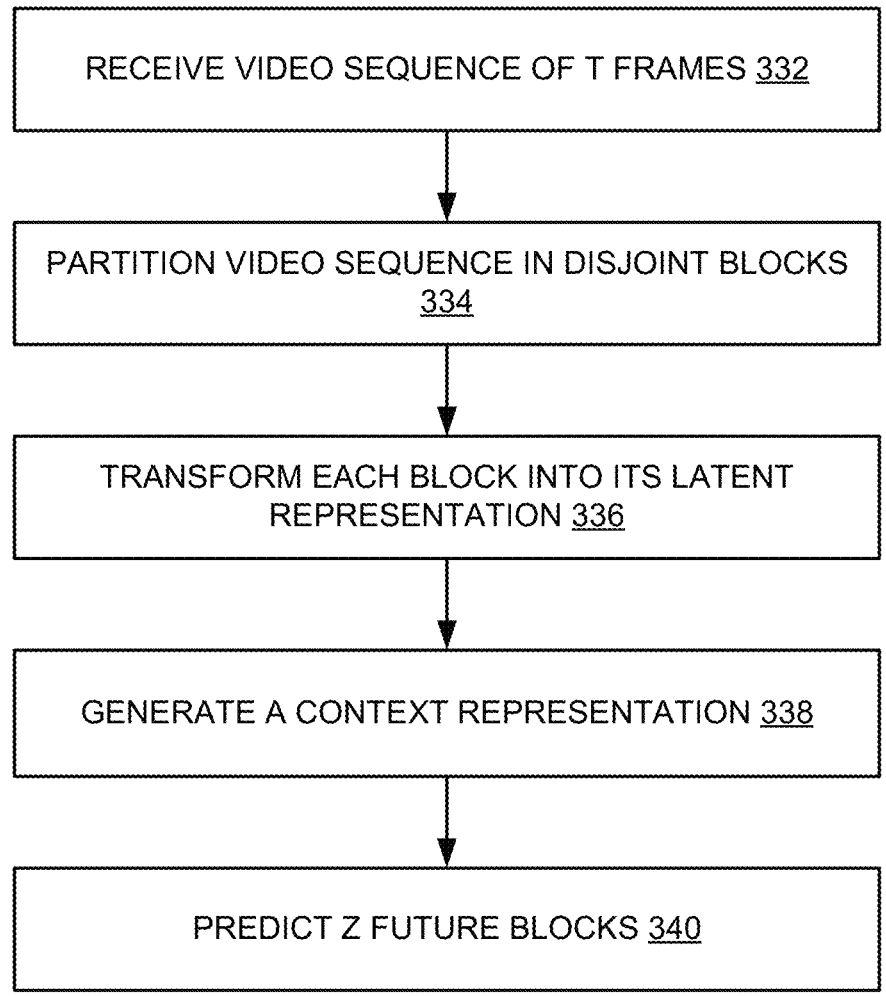
FIG. 3 is an operational flow diagram illustrating an example process for prediction using video sequences in accordance with various embodiments.

Although the example described above with reference to FIGS. 1 and 2 are described in terms of processing to images, in various embodiments the systems and methods can be applied to video sequences to allow self supervised training of video sequences. Because video sequences are generally comprised of individual image frames, the principles described above with reference to FIGS. 1 and 2 may still apply. FIG. 3 is an operational flow diagram illustrating an example process for prediction using video sequences in accordance with various embodiments. Embodiments may be implemented that construct a binary classification task where a classifier that is fed with real and noisy samples with the training objective being to distinguish them. With reference now to FIG. 3, at operation 332 the system receives a video sequence V that includes T frames. Although these may be frames of RGB images, they need not be RGB images in various embodiments. The frames may be defined as having a resolution H×W, and C channels $\{i_1, i_2, \ldots, i_T\}$, where $i_t \in \mathbf{R}^{H \times W \times C}$.

Assume T=N*K, where N is the number of blocks and K denotes the number of frames per block. At operation 334, the system partitions the video sequence V into N disjoint blocks. For example, the sequence may be partitioned into N blocks as V=$\{x_1, x_2, \ldots, x_N\}$, where $x_j \in \mathbf{R}^{K \times H \times W \times C}$. In various embodiments, the number of frames per block K can be the same for each block. In other embodiments, the number of frames per block K can vary from block to block.

At operation 336, the system transforms each block into a latent representation. For example, in embodiments a non-linear encoder f(.) transforms each input block $x_j$ into its latent representation $z_j = f(x_j)$. As shown in the example of FIG. 1, a plurality of encoders can be used to arrive at desired embeddings.

At operation 338, the system generates a context representation. In various embodiments, an aggregation function, g(.) takes a sequence of latent representations $\{z_1, z_2, \ldots, z_j\}$ as input and generates a context representation cj=g($z_1, z_2, \ldots z_j$). In embodiments, $z_j \in \mathbf{R}^{H' \times W' \times D}$ and $c_j \in \mathbf{R}^D$. D represents the embedding size and H', W' represent down-sampled resolutions as different regions in $z_j$ represent features for different spatial locations. $z'_j$ may be defined as $z'_j$=Pool($z_j$), where $z'_j \in \mathbf{R}^D$ and c=F(V), where F(.)=g(f (.)). By way of example only, in some embodiments, H'=4; W'=4; and D=256, although these values may vary in different implementations.

At operation 340, the system predicts $z$ future blocks in order to learn effective representations. Embodiments may use a dense predictive coding framework for self-supervised learning on the video sequences that learns a dense encoding of spatio-temporal blocks. Particularly, embodiments may use the context representation generated operation 338 as input to predict the future representation. The task may be configured to force the model to capture all the necessary contextual semantics in $c_t$ and all frame level semantics in $z_t$. Embodiments may define $\phi(.)$, which takes as input $c_t$ and predicts the latent state of the future frames. An example formulation is given as:

$$\tilde{z}_{t+1} = \phi(c_t),$$

$$\tilde{z}_{t+1} = \phi(g(z_1, z_2, \ldots, z_t)),$$

$$\tilde{z}_{t+2} = \phi(g(z_1, z_2, \ldots, z_t, \tilde{z}_{t+1})),$$

where $\phi(.)$ takes $c_t$ as input and predicts the latent state of the future frames. Embodiments then utilize the predicted $\tilde{z}_{t+1}$ to compute $\tilde{c}_{t+1}$. Embodiments may repeat this over multiple steps. While some experiments restricted this to predict three steps in to the future, other quantities of iteration can be implemented.

Embodiments may use the predicted $\tilde{z}_{t+1}$ while predicting $\tilde{z}_{t+2}$ to force the model to capture long range semantics. This may be repeated for a varying number of steps, although the difficulty increases tremendously as the number of steps increases. In some embodiments, for example, the system may be configured to predict the next three blocks using the first five blocks, although other quantities of blocks may be used and predicted.

Embodiments may utilize different data sets. For example, Kinetics400 contains 400 human action classes, with at least 400 real-world video clips for each action. Each clip is approximately 10 seconds in duration and is taken from a different YouTube® video. The actions are human focused and cover a broad range of classes including human-object and human-human interactions. The large diversity and variance in the dataset make it a challenging dataset.

The HMDB51 dataset contains approximately 6,800 real-world video clips from 51 action classes. These action classes cover a wide range of actions, including facial actions, facial action with object manipulations, general body movement, and general body movements with human interactions. This dataset is challenging as it contains many lower-quality videos with significant camera motions and also the number of samples are not sufficient to effectively train a deep network.

The UCF101 dataset contains approximately 13,320 videos from 101 action classes that are divided into 5 categories—human-object interaction, body-movement only, human-human interaction, playing musical instruments and sports. Action classification in this dataset is challenging owing to variations in pose, camera motion, viewpoint and spatio-temporal extents of an action.

Figure 4:
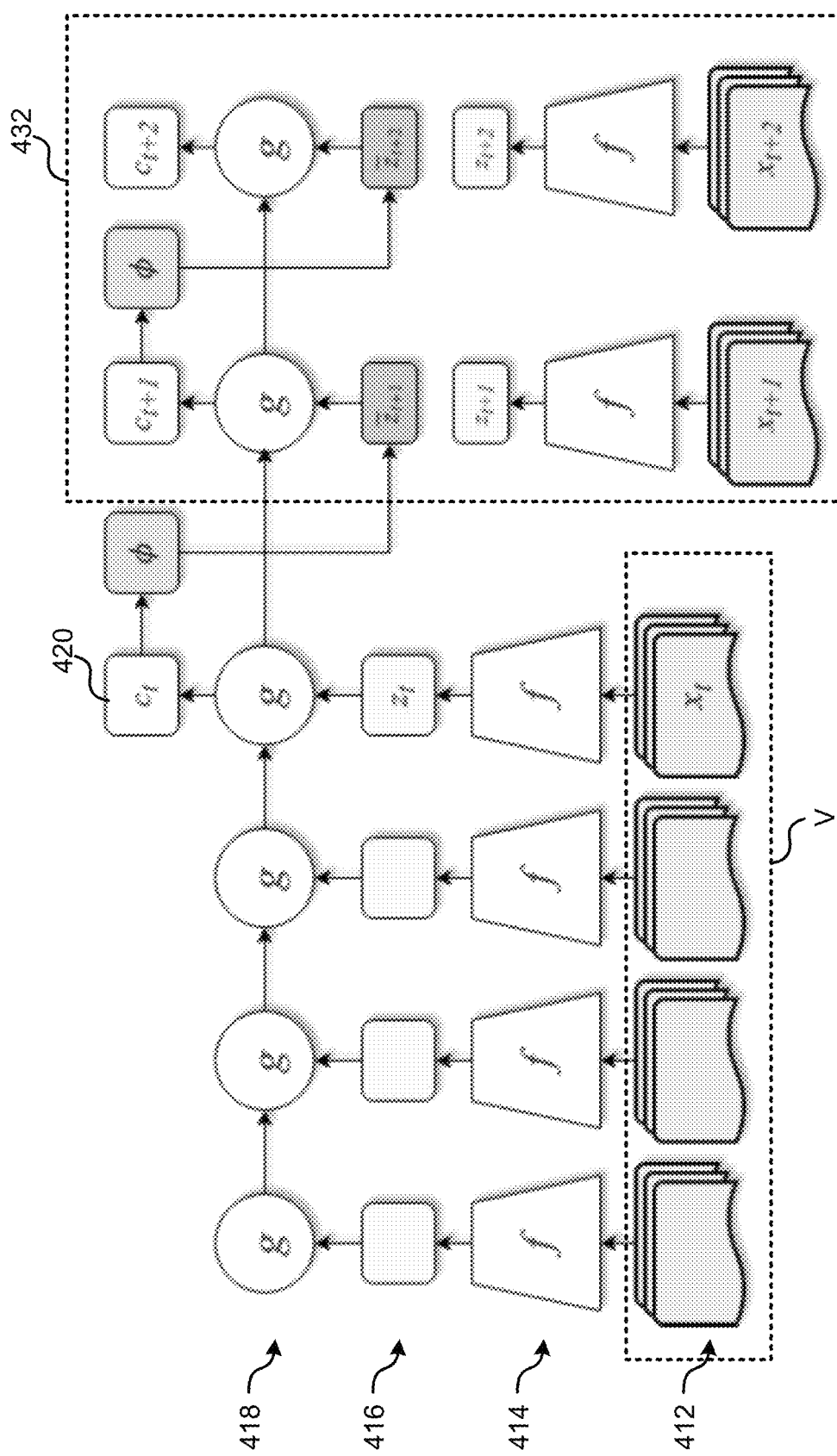
FIG. 4 illustrates an example architectural representation that can be implemented as part of the cooperative contrastive learning process in accordance with various embodiments.

As noted above, embodiments may utilize dense predictive coding techniques to predict varying semantic representations based on captured video frames. For example, recent past representations can be used to predict future frames. FIG. 4 illustrates an example architectural representation that can be implemented as part of the cooperative contrastive learning process in accordance with various embodiments. Particularly, this architecture may be implemented to predict contrastive loss.

Figure 5:
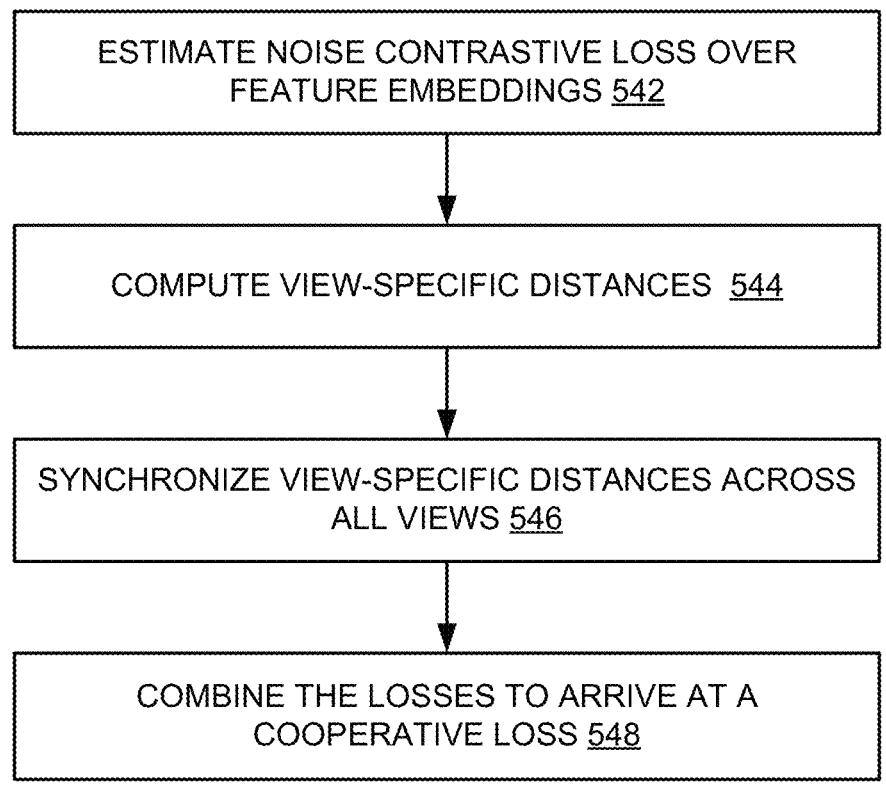
FIG. 5 illustrates an example for cooperative contrastive learning (CoCon) in accordance with various embodiments.

With reference now to FIG. 4, the system operates on a video sequence V that includes T frames. The frames may be defined as having a resolution H×W, and C channels $\{i_1, i_2, \ldots, i_T\}$, where $i_t \in \mathbf{R}^{H \times W \times C}$. The video sequence V is broken up into a plurality of blocks 412. For example, the sequence may be partitioned into N blocks as $V=\{x_1, x_2, \ldots, x_N\}$, where $x_j \in \mathbf{R}^{K \times H \times W \times C}$. As noted above, T=N*K, where N is the number of blocks and K denotes the number of frames per block 412. The blocks disjoint blocks, and is also noted above, the number of frames per block K can be the same for each block. An encoder function 414 may be used to encode each block 412 into its corresponding latent representation 416. For example, in embodiments a non-linear encoder f(.) transforms each input block $x_j$ into its latent representation $z_j=f(x_j)$. An aggregation function 418 is applied to each latent representation 416 to aggregate the plurality of latent representations into a context representation 420. The aggregation function 418 takes a sequence of latent representations $\{z1, z2, \ldots, zj\}$ as input and generates a context representation $cj=g(z_1, z_2, \ldots, z_j)$. In embodiments, $z_j \in \mathbf{R}^{H' \times W' \times D}$ and $c_j \in \mathbf{R}^D$. D represents the embedding size and H', W' represent down-sampled resolutions as different regions in $z_j$ represent features for different spatial locations. $z'_j$ may be defined as $z'_j = \text{Pool}(z)$, where $z'_j \in \mathbf{R}^D$ and c=F(V), where F(.)=g(f(.)). Embodiments may define φ(.), which takes as input $c_t$ and predicts the latent state of the future frames. Noise Contrastive Estimation (NCE) module 432 may be included to use an NCE loss over the feature embeddings FIG. 5 illustrates an example for cooperative contrastive learning (CoCon) in accordance with various embodiments. Referring now to FIG. 5, at operation 542, the system may be configured to compute Noise Contrastive Estimation (NCE) loss over the feature embeddings as:

$$\mathcal{L}_{cpc} = -\sum_{i,k} \left( \log \frac{\exp(\tilde{z}_{i,k} \cdot z_{i,k}/\tau)}{\sum_{j,m} \exp(\tilde{z}_{i,k} \cdot z_{j,m}/\tau)} \right) \quad (1)$$

where $\tilde{z}_{i,k}$ represents the feature embedding for the $i^{th}$ time-step and the $k^{th}$ spatial location. As noted above, $\tilde{z} \in \mathbf{R}^{H' \times W' \times D}$ preserves the spatial layout. Embodiments normalize $\tilde{z}_{i,k}$ to lie on the unit hypersphere. The NCE loss is a cross-entropy loss distinguishing one positive pair from all the negative pairs present in a video sequence. Embodiments may use temperature r=0.005, although this value may vary. In a batch setting with multiple video clips, it is possible to have more inter-clip negative pairs.

To extend this to multiple views, embodiments may utilize different encoders Øv for each view v. We train these encoders by utilizing $\mathcal{L}_{cpc}$ for each of them independently, giving us, $\mathcal{L}_{cpc} = \Sigma_v \mathcal{L}^v_{cpc}$.

Some conventional solutions tackle multi-view self-supervised learning by maximizing mutual information across views while using contrastive losses. These may involve using positive and negative pairs generated using structural constraints, e.g., spatio-temporal proximity in videos. Although such representations may capture semantic content suitably, they unintentionally encourage discriminating video clips that contain semantically similar content due to the inherent nature of pair generation, i.e. video clips from different videos are negatives.

Embodiments may be implemented to soften this constraint by indirectly deriving pair proposals using different views. Such a co-operative scheme may benefit all models as each individual view gradually improves. Better models are generally able to generate better proposals, improving performance of all views creating a positive feedback loop. Because in most circumstances semantic features should be universal across views, potential incorrect proposals from one view should cancel out through proposals from other views.

Accordingly, at operation 544, the system may be configured to compute view-specific distances, and at operation 546, the system may be configured to synchronize these distances across all views. Systems and methods may be implemented to enforce a consistency loss between distances from each view. Stated from another perspective, embodiments may encourage relationships between instances to be the same across views (i.e., similar pairs in one view should be a similar pair in other views as well). This distance metric may be represented by $\mathcal{D}(.)$. Embodiments may use the cosine distance, L1, L2, JS-divergence or other distances.

For purposes of this disclosure, the representation $h^a$ denotes the representation for the $v^{th}$ view of instance a. Using h=z' yields block level features. The resultant distance loss is described as follows:

$$\mathcal{L}_{sync} = \sum_{v_0, v_1} \sum_{a,b} \left( \mathcal{D}(h^a_{v_0}, c^b_{h_0}) - \mathcal{D}(h^a_{v_1}, c^b_{v_1}) \right)^2 \quad (2)$$

In practice, a goal of the approach may be to make the distance between different views and their embeddings more consistent, even though some distances might not be close. Embodiments may next derive discriminative scores. These may be based on pairs that are both negative ($\mathcal{D} \to 1$) and positive ($\mathcal{D} \to 0$).

To promote well distributed distances, embodiments may compute a hinge loss as follows:

$$\mathcal{L}_{sim} = \sum_{v_0, v_1} \sum_{a} \mathcal{D}(h^a_{v_0}, h^a_{v_1}) + \mu \sum_{a \neq b} \max(0, 1 - \mathcal{D}(h^a_{v_1}, c^b_{v_1})) \quad (3)$$

$\mathcal{L}_{sim}$ is the hinge loss, where the first term pushes representations of the same instance in different views closer; while the second term pushes different instances apart. Because the number of structural negative pairs are much larger than the positives, embodiments may introduce μ in order to balance the loss weights, and may choose μ such that the first and second components contribute equally to the loss.

Note that $\mathcal{L}_{sim}$ entangles different views together. Alternative embodiments may be configured to define such a loss individually for each view. However, diversity is inherently encouraged through $\mathcal{L}_{cpc}$, and interactions between views have the side-effect of increasing their mutual information (MI), which may lead to improved performance.

At operation 548, the system may be configured to combine the above losses to arrive at a cooperative loss, $\mathcal{L}_{coop}=\mathcal{L}_{sync}+\alpha\cdot\mathcal{L}_{sim}$. In some embodiments, α=10.0, but this parameter may vary. The overall loss may then be given by given by $\mathcal{L}_{cocon}=\mathcal{L}_{cpc}+\lambda\cdot\mathcal{L}_{coop}$. $\mathcal{L}_{cpc}$ encourages our model to learn good features for each view, while $\mathcal{L}_{coop}$ nudges it to learn higher-level features using all views while respecting the similarity structure across them.

Examples provide a self-supervised learning framework for any dataset with multiple views, including video action classification. The 1$^{st}$ example focuses on human action datasets i.e. UCF101, HMDB51 and Kinetics400. UCF101 contains 13K videos spanning over 101 human action classes. HMDB51 contains 7K video clips mostly from movies for 51 classes. Kinetics-400 (K400) is a large video dataset with 306K video clips from 400 classes.

Figure 6:
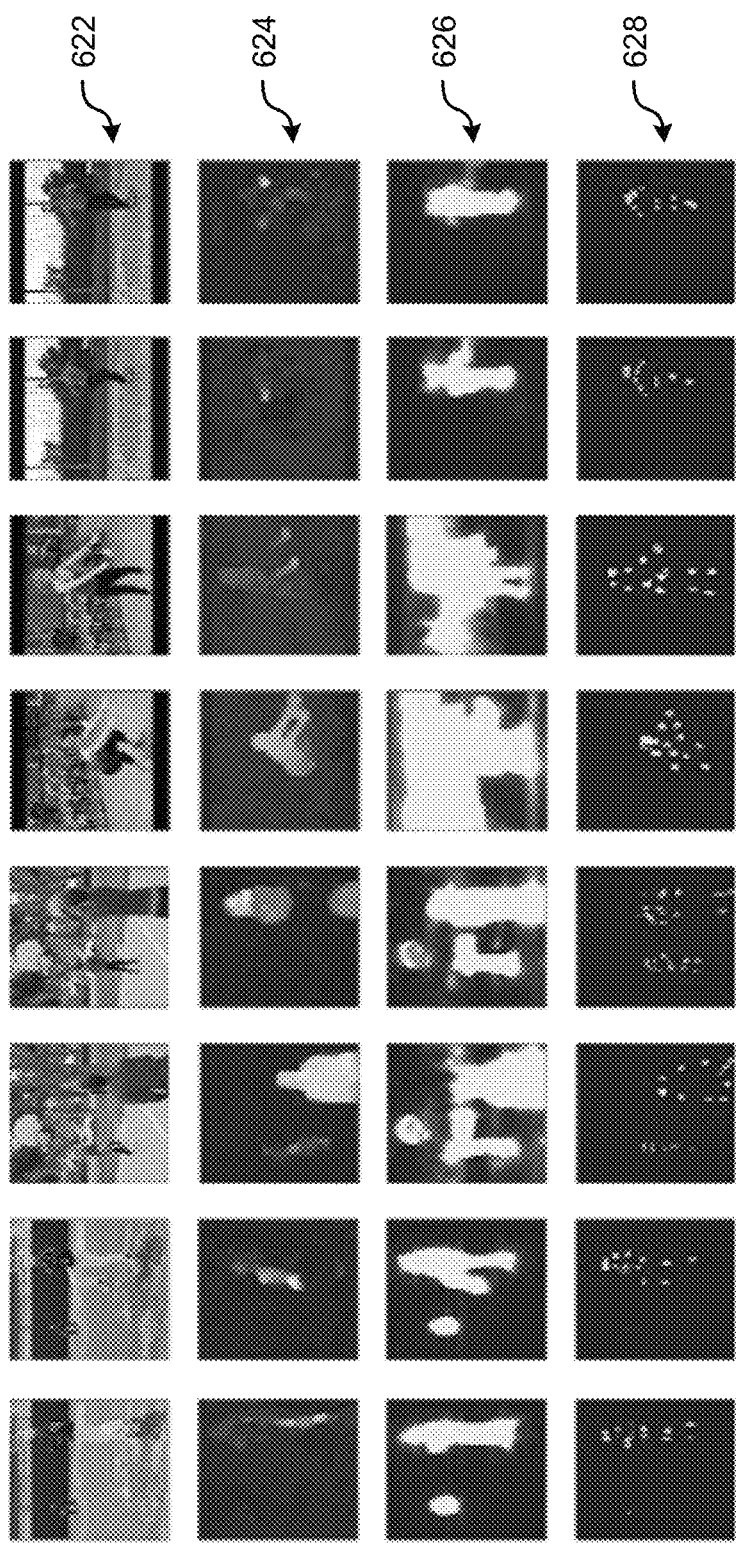
FIG. 6 illustrates visual samples for each view in an example application.

This example utilized different views in the multi-view experiments. For Kinetics-400, the system was implemented to learn encoders for RGB and Optical Flow, and used Farneback flow instead of the commonly used TVL1-Flow, because it generally results in quicker computations thereby lowering the computation budget. Although this flow led to lower performance compared to TVL1, the essence of the experiment remains unaffected. For UCF101 and HMDB51, embodiments learned encoders for RGB, TVL1 Optical Flow, Pose Heatmaps (PoseHMs) and Human Segmentation Masks (SegMasks). FIG. 6 illustrates visual samples for each view. PoseHMs and SegMasks were generated using an off-the-shelf detector without any form of pre/post-processing.

Referring now to FIG. 6, the examples for each view are RGB 622, flow 624, SegMasks 626 and poses 628. As this illustrates, there is noise in a few samples and this is especially prevalent in SegMasks 626. There were multiple instances in which poses and SegMasks exhibited noise, but those are not shown in FIG. 6.

Table 1 illustrates the impact of losses on performance of models when jointly trained with RGB and Flow. CoCon (i.e. L$_{total}$ (67.8)) comfortably improves performance over CPC (i.e. L$_{cpc}$ (63.7)). L$_y$=L$_x$+λL$_y$ where λ=10.0 for this experiment.

TABLE 1

Impact of Losses on Performance.

| View | Random | $\mathcal{L}_{cpc}$ | $\mathcal{L}_{sim}^{cpc}$ | $\mathcal{L}_{sync}^{cpc}$ | $\mathcal{L}_{cocon}$ |
|---|---|---|---|---|---|
| RGB | 46.7 | 63.7 | 66.0 | 62.7 | 67.8 |
| Flow | 65.3 | 69.8 | 71.4 | 69.2 | 72.5 |

Table 2 illustrates the impact of pretraining comparison. CoCon demonstrates a consistent improvement in both RGB and Flow.

TABLE 2

Impact of Pretraining Comparison.

| | | RGB | | Flow$^2$ | |
|---|---|---|---|---|---|
| Method | Pretrain | UCF | HMDB | UCF | HMDB |
| Random | | 46.7 | 20.6 | 65.3 | 31.2 |
| CPC | K400 | 68.6 | 35.5 | 69.8 | 40.8 |

TABLE 2-continued

Impact of Pretraining Comparison.

| | | RGB | | Flow$^2$ | |
|---|---|---|---|---|---|
| Method | Pretrain | UCF | HMDB | UCF | HMDB |
| CoCon | UCF | 67.8 | 37.7 | 72.5 | 44.1 |
| CoCon | K400 | 72.1 | 46.5 | 71.8 | 44.2 |

Table 3 illustrates the impact of co-training on views. In this instance, CoCon was trained with 4 modalities: RGB, Flow, PoseHM and SegMask.

TABLE 3

Impact of Co-Training on Views.

| | RGB | | Flow | | PoseHM | | SegMask | |
|---|---|---|---|---|---|---|---|---|
| Method | UCF | HMDB | UCF | HMDB | UCF | HMDB | UCF | HMDB |
| Random | 46.7 | 20.6 | 65.3 | 31.2 | 51.7 | 33.0 | 42.7 | 26.3 |
| CPC | 63.7 | 33.1 | 71.2 | 44.6 | 56.4 | 42.0 | 53.7 | 32.8 |
| CoCon | 71.0 | 39.0 | 74.5 | 45.4 | 58.7 | 42.6 | 55.8 | 34.0 |

This experiment utilized N=8 and K=5 and subsampled the input by uniformly choosing one out of every 3 frames. Our predictive task involves predicting the last three blocks using the first five blocks. The experiment utilized standard data augmentations during training, and was run using 4 GPUs with a batch size of 16 samples per GPU. Multiple spatio-temporal samples ensure sufficient negative examples despite the small batch size used for training.

The experiment used a 3D-ResNet as the encoder f(.), and only expanded the convolutional kernels present in the last two residual blocks to be 3D. The experiment used used 3D-ResNet18, denoted as ResNet18. A weak aggregation function g(.) Was utilized in order to learn a strong encoder f(.). Specifically, the experiment implemented a one-layer Convolutional Gated Recurrent Unit (ConvGRU) with a kernel 460 size (1, 1) as g(i). The weights were shared amongst all spatial positions in the feature map. This design allows the aggregation function to propagate features in the temporal axis. A dropout [32] with p=0.1 was used when computing the hidden state at each time step. A shallow two-layer perceptron was used as the predictive function ϕ(.). As noted above $z'_j=\text{Pool}(z_j)$ where $z'_j \in R_D$. experiment also utilized stacked max pool layers as Pool(.).

To construct blocks to pass to the network, one out of every 3 frames was chosen uniformly. These were then grouped into 8 blocks containing 5 frames each. Because the videos used were typically 30 fps, each block roughly covered 0.5 seconds worth of content. The predictive task designed involves predicting the last three blocks using the first five. Therefore, the system effectively predicted the next 1.5 seconds based on the first 2.5 seconds.

Random cropping, random horizontal flipping, random greying, and color jittering were used to perform data augmentation in the case of images. For optical flow, only random cropping was used on the image. As noted above, Keypoint Heatmaps and Segmentation Confidence Masks are modelled as images, therefore random cropping and horizontal flipping were performed in this case. Note that random cropping and flipping were applied for the entire block in a consistent way. Random greying and color jittering were applied in a frame-wise manner to prevent the network from learning low-level features such as optical flow. Therefore, each video block may contain both colored and grey-scale image with different contrast.

All individual view-specific models were trained independently using only $\mathcal{L}_{cpc}$. then, all view-specific models were trained simultaneously using $\mathcal{L}_{cocon}$. All models were trained end-to end using an optimizer with an initial learning rate $10^{-3}$ and weight decay $10^{-5}$. Learning rate was decayed to $10^{-4}$ when validation loss plateaus. A batch size of 16 samples per GPU was used, and the experiments used 4 GPUs. Models were trained on UCF101 for 100 epochs using $\mathcal{L}_{cpc}$, after which they were collectively trained together for 60 epochs using $\mathcal{L}_{cocon}$. this was repeated for Kinetics400 with reduced epochs. Models were trained on Kinetics400 for 80 epochs using $\mathcal{L}_{cpc}$ and further for 40 epochs using $\mathcal{L}_{cocon}$.

The learned representations were evaluated by their performance on the downstream task of action classification. This followed the evaluation practice from recent works and used the weights learned through our self-supervised framework as initialization for supervised learning. The process was then fine-tuned end-to-end using class label supervision. The learned composite function F(.) Was used to generate context representations for video blocks. The context feature was further passed through a spatial pooling layer followed by a fully-connected layer and a multi-way softmax for action classification. We use dropout with p=0.7 for classification. The models were fine-tuned for 100 epochs with learning rate decreasing at different steps. During inference, video clips from the validation set were densely sampled from an input video and cut into blocks with half-length overlapping. The softmax probabilities were averaged to give the final classification result.

The experiment revealed benefits of preserving similarities across view-specific feature spaces. The experiment demonstrated that respecting structure across views results in emergence of higher-order semantics without additional supervision e.g. sensible class relationships and good feature representations. In other words, the qualitative experiments illustrate that the models can capture higher-order class relationships.

Figure 7:
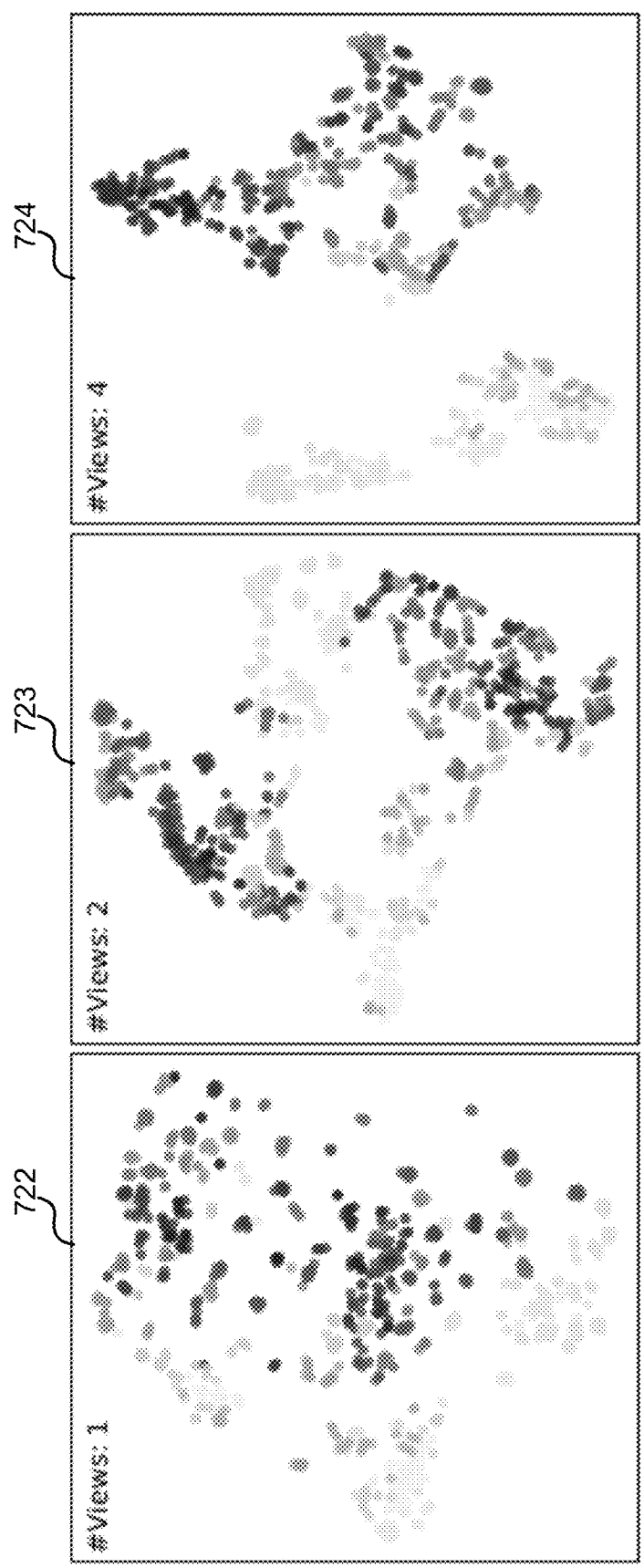
FIG. 7 illustrates the emergence of relationship between different actions using CoCon with a varying number of views in example applications.

Experiment explored t-SNE visualizations of the learned representations on the $1^{st}$ test split of UCF101 extracted 504 using F(.). The model was trained on the corresponding train split to ensure testing out of sample quality. FIG. 7 illustrates the emergence of relationships between different actions using CoCon with a varying number of views. For clarity, only 21 action classes are displayed. The action classes were loosely ordered according to their relationships. Classes having similar colors are semantically similar. Even though this was conducted in a self-supervised setting, the approach was able to uncover deeper semantic features allowing us to uncover inter-class relationships. This demonstrates a a much more concise and consistent clustering in CoCon compared to CPC. This also demonstrates a distinct improvement in the compactness of the clusters the number of uses increased. Note that CoCon becomes the same as CPC when the number of views is equal to 1. In FIG. 7, 722 illustrates data with one view, 723 illustrates data with 2 views, and 724 illustrates data with 4 views.

In order to study the manifold consistency across different views, relationships between classes were studied by inferring their similarities through the learned features. Cosine similarities were compared across video clips from different classes. The most similar 5 classes were determined for each action. This process was repeated for all views and look at the consistency of the results. Ideally, semantically similar classes should be consistent across all views, assuming the views reasonably capture the essence of the task we're interested in.

This demonstrated that CoCon leads to much higher consistency across different views. Specifically, the experiment revealed 41 classes that have at least four out of five top-classes consistent in all views; as opposed to 10 classes in CPC. Similar patterns emerged when considering other thresholds as well. In order to confirm that the nearest classes are actually sensible, consider the most-similar classes for a few action classes. In this experiment the nearest actions generated were semantically related to the original actions. In the cases of PlayingCello, the system encountered a cluster of categories involving playing instruments. Similarly for BasketBall, the system demonstrated an emergence of sports-based relationships even though there is no visual commonality between categories. The experiment also revealed few seemingly unrelated classes as well, e.g., BoxingPunchingBag and YoYo; SalsaSpin and WalkingWithDog. A deeper inspection into the samples is required to comment whether this truly makes sense. It is worth noting that as these nearest action classes are mostly consistent across different views. Because views such as Optical-Flow, SegMasks and KeypointHeatmap do not have such information and are much low-dimensional.

Figure 8:
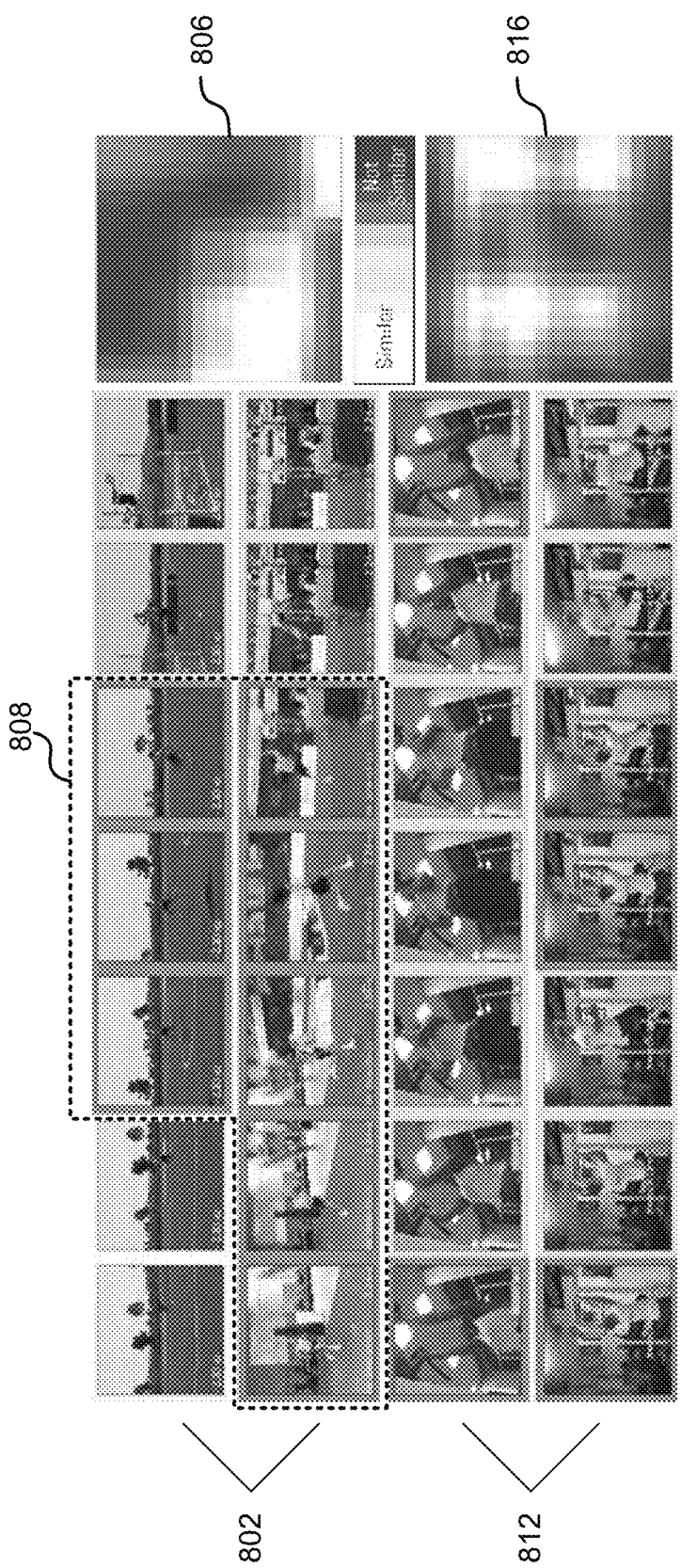
FIG. 8 illustrates soft alignment videos for a test split using CoCon in an example application.

Even using only self-supervision, the embeddings are able to capture relevant semantics through the multi-view approach allowing loose alignment between videos. FIG. 8 illustrates soft alignment videos for UCF101 test split using CoCon pre-trained on UCF101. The first pair of videos 802 involves high jumps. The periodicity captured in the heatmap 806 illustrates a strong region of similarity in the lower right-hand corner identifying a strong similarity among images in the grouping 808. This example illustrates that the system is roughly able to align the running and jumping phases though they happen at different times. The second pair of videos 812 involves pull-ups. Again, the heat map 816 highlights areas of similarity. Embodiments may utilize cosine similarities to infer associations between videos. The heat map may be smooth to make it visually appealing.

As these examples illustrate, CoCon can be configured to look past purely visual background features and focus on actions even though it used only RGB inputs. For example, the data illustrates that the system can retrieve close neighbors for high jumps in pull-ups even though the videos are visually different with varying poses.

By leveraging relationships across multiple views, embodiments encourage the self-supervised learning objective to be aligned with the underlying semantic similarity. The experiments demonstrate the effectiveness of this approach on the downstream task of action classification, and illustrate the semantic structure of the representation. Additional input views generated by off-the-shelf computer vision algorithms can lead to significant improvements, even though they are noisy and derived from the RGB modality. This further establishes the feasibility of utilizing multi-view approaches on datasets such as UCF101 and HMDB51 traditionally not considered multi-view.

Figure 9:
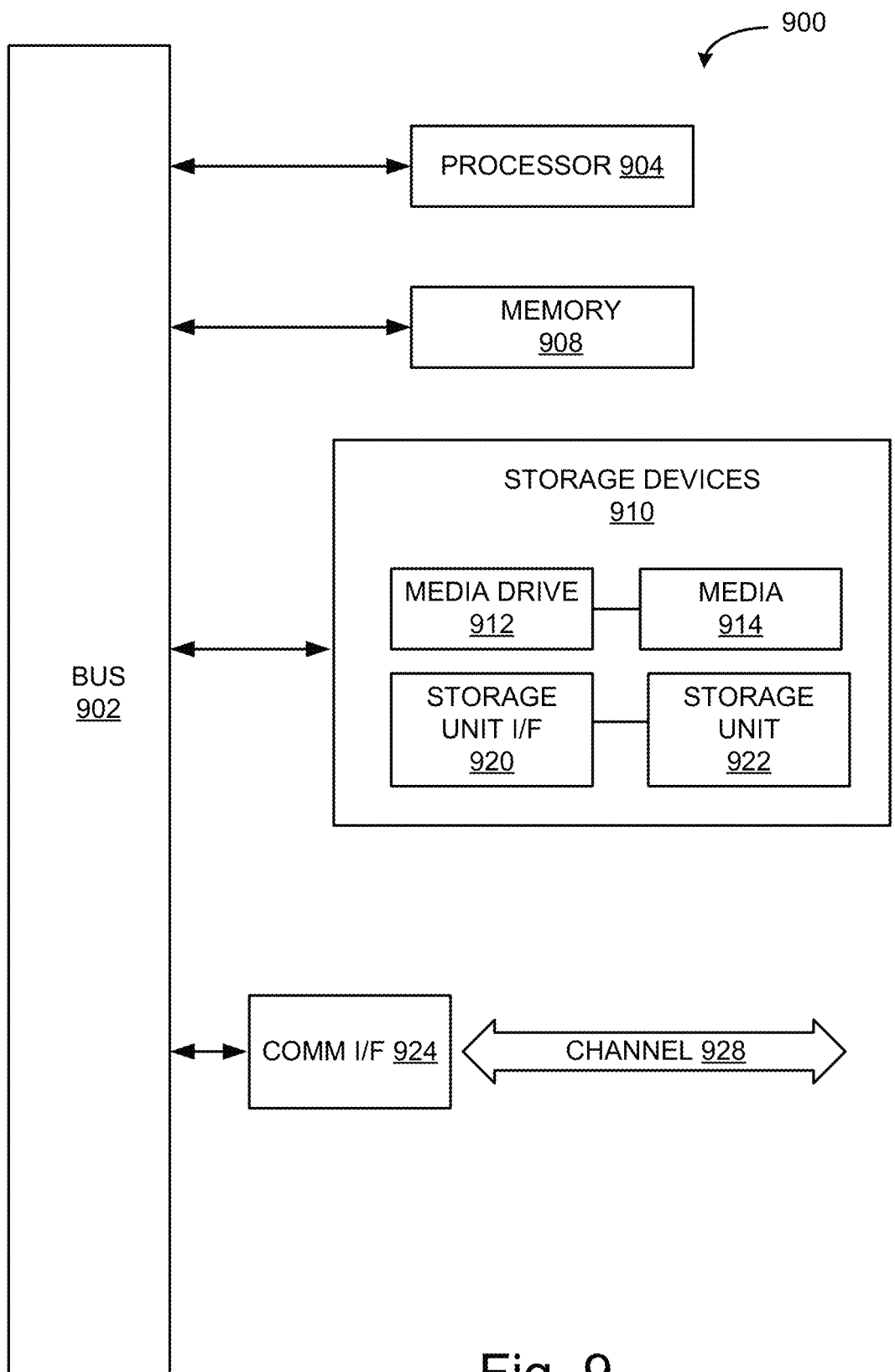
FIG. 9 illustrates an example computing component that may be used to implement various features of embodiments described in the present disclosure.

As used herein, the term module describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 9. Various embodiments are described in terms of this example-computing component 900. After reading this description, it will become apparent to a person skilled in the relevant art how to implement the application using other computing components or architectures.

Referring now to FIG. 9, computing component 900 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example, portable computing devices, and other electronic devices that might include some form of processing capability.

Computing component 900 might include, for example, one or more processors, controllers, control components, or other processing devices. This can include a processor, and/or any one or more of the components of the system. Processor 904 might be implemented using a general-purpose or special-purpose processing engine such as, for example, a microprocessor, controller, or other control logic. Processor 904 may be connected to a bus 902. However, any communication medium can be used to facilitate interaction with other components of computing component 900 or to communicate externally.

Computing component 900 might also include one or more memory components, simply referred to herein as main memory 908. For example, random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid-state drive, a magnetic tape drive, an optical drive, a compact disc (CD) or digital video disc (DVD) drive (R or RW), or other removable or fixed media drive might be provided. Storage media 914 might include, for example, a hard disk, an integrated circuit assembly, magnetic tape, cartridge, optical disk, a CD or DVD. Storage media 914 may be any other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory component) and memory slot. Other examples may include a PCMCIA slot and card, and other fixed or removable storage units 922 and interfaces 920 that allow software and data to be transferred from storage unit 922 to computing component 900.

Computing component 900 might also include a communications interface 924. Communications interface 924 might be used to allow software and data to be transferred between computing component 900 and external devices. Examples of communications interface 924 might include a modem or softmodem, a network interface (such as Ethernet, network interface card, IEEE 802. XX or other interface). Other examples include a communications port (such as for example, a USB port, IR port, RS232 port Bluetooth® interface, or other port), or other communications interface. Software/data transferred via communications interface 924 may be carried on signals, which can be electronic, electromagnetic (which includes optical) or other signals capable of being exchanged by a given communications interface 924. These signals might be provided to communications interface 924 via a channel 928. Channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein.

It should be understood that the various features, aspects and functionality described in one or more of the individual embodiments are not limited in their applicability to the particular embodiment with which they are described.

Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for multi-view self-supervised learning, comprising:
    receiving a plurality of video sequences, the video sequences comprising a plurality of image frames;
    applying selected images of a first and second video sequence of the plurality of video sequences to a plurality of different encoders to derive a plurality of embeddings for different views of the selected images of the first and second video sequences, the plurality of embeddings comprising RGB embeddings, flow embeddings, and KeyPoint embeddings;
    determining distances of the derived plurality of embeddings for the selected images of the first and second video sequences;
    detecting inconsistencies between distances of the RGB embeddings, distances of the flow embeddings, and distances of the KeyPoint embeddings outside a threshold distance; and
    predicting semantics of a future image based on the determined distances.

2. The method of claim 1, further comprising partitioning the received plurality of video sequences into disjoint blocks; and wherein applying selected images of a first and second video sequence of the plurality of video sequences to a plurality of respective encoders to derive a plurality of embeddings, comprises:
    transforming the disjoint blocks into corresponding latent representations for the disjoint blocks; and
    generating context representations from the latent representations.

3. The method of claim 2, wherein predicting future semantics based on the determined distances comprises capturing contextual semantics and frame level semantics to predict a latent state of future images.

4. The method of claim 1, further comprising using predicted semantics of a future image to predict semantics of an image that is farther into the future than the future image.

5. The method of claim 1, further comprising computing a noise contrastive estimation loss over at least some of the plurality of embeddings.

6. The method of claim 5, wherein the noise contrastive estimation loss comprises an entropy loss distinguishing a positive pair of embeddings from negative pairs of embeddings in a video sequence.

7. The method of claim 1, wherein the plurality of different encoders for the selected images of the first and second video sequences comprise at least two of a flow encoder, an RGB encoder and a keypoint encoder.

8. The method of claim 1, wherein determining distances comprises determining view-specific distances for the different views, and wherein the method further comprises synchronizing the distances across all views.

9. The method of claim 8, further comprising enforcing a consistency loss between distances from each of the different views.

10. The method of claim 8, further comprising deriving discriminative scores based on pairs of embeddings that comprise positive and negative distances.

11. A system for multi-view self-supervised learning, comprising:
    a processor; and
    a memory coupled to the processor to store instructions, which when executed by the processor, cause the processor to perform operations, the operations comprising:
        receiving a plurality of video sequences, the video sequences comprising a plurality of image frames;
        applying selected images of a first and second video sequence of the plurality of video sequences to a plurality of different encoders to derive a plurality of embeddings for different views of the selected images of the first and second video sequences, the plurality of different encoders comprising RGB embeddings, flow embeddings, and KeyPoint embeddings;
        determining distances of the derived plurality of embeddings for the selected images of the first and second video sequences;
        detecting inconsistencies between distances of the RGB embeddings, distances of the flow embeddings, and distances of KeyPoint embeddings outside a threshold distance; and
        predicting semantics of a future image based on the determined distances.

12. The system of claim 11, wherein the operations further comprise partitioning the received plurality of video sequences into disjoint blocks; and wherein applying selected images of a first and second video sequence of the plurality of video sequences to a plurality of respective encoders to derive a plurality of embeddings, comprises:
   transforming the disjoint blocks into corresponding latent representations for the disjoint blocks; and
   generating context representations from the latent representations.

13. The system of claim 12, wherein predicting future semantics based on the determined distances comprises capturing contextual semantics and frame level semantics to predict a latent state of future images.

14. The system of claim 11, wherein the operations further comprise using predicted semantics of a future image to predict semantics of an image that is farther into the future than the future image.

15. The system of claim 11, wherein the operations further comprise computing a noise contrastive estimation loss over at least some of the plurality of embeddings.

16. The system of claim 15, wherein the noise contrastive estimation loss comprises an entropy loss distinguishing a positive pair of embeddings from negative pairs of embeddings in a video sequence.

17. The system of claim 11, wherein the plurality of different encoders for the selected images of the first and second video sequences comprise at least two of a flow encoder, an RGB encoder and a keypoint encoder.

18. The system of claim 11, wherein determining distances comprises determining view-specific distances for the different views, and wherein the operations further comprise synchronizing the distances across all views.

19. The system of claim 18, wherein the operations further comprise enforcing a consistency loss between distances from each of the different views.

20. The system of claim 18, wherein the operations further comprise deriving discriminative scores based on pairs of embeddings that comprise positive and negative distances.

* * * * *